(12) United States Patent  (10) Patent No.: US 7,768,745 B2
Okada et al.  (45) Date of Patent: Aug. 3, 2010

(54) SHOCK IMPROVEMENT RAMP FOR LOAD/UNLOAD MECHANISM AND MAGNETIC DISK DRIVE

(75) Inventors: Takahisa Okada, Kanagawa (JP); Tomoki Hiramatsu, Kanagawa (JP); Kohji Takahashi, Kanagawa (JP); Katsuya Watanabe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 999 days.

(21) Appl. No.: 11/437,181

(22) Filed: May 18, 2006

(65) Prior Publication Data

US 2006/0262448 A1  Nov. 23, 2006

(30) Foreign Application Priority Data

May 19, 2005  (JP) .............................. 2005-146723

(51) Int. Cl.
  G11B 21/22  (2006.01)
  G11B 21/12  (2006.01)
(52) U.S. Cl. .................................................. 360/254.8
(58) Field of Classification Search .............. 360/254.3, 360/254.4, 254.7, 254.8, 254.9, 255.2, 255.3, 360/255.6, 255.7
  See application file for complete search history.

(56) References Cited

U.S. PATENT DOCUMENTS 6,055,134 A * 4/2000 Boutaghou ............... 360/254.4

| 6,538,851 | B1 | 3/2003 | Sasaki |
| 6,717,773 | B2 | 4/2004 | Hawwa et al. |
| 6,765,762 | B2 | 7/2004 | Yanagihara |
| 2002/0131212 | A1* | 9/2002 | Yanagihara-shi ......... 360/254.8 |
| 2003/0179502 | A1* | 9/2003 | Kim ........................ 360/254.3 |

FOREIGN PATENT DOCUMENTS

| JP | 2001-101814 | 4/2001 |
| JP | 2001-325778 | 11/2001 |
| JP | 2002-093090 | 3/2002 |
| JP | 2002-367314 | 12/2002 |

* cited by examiner

Primary Examiner—Craig A. Renner
Assistant Examiner—Tamara Ashford
(74) Attorney, Agent, or Firm—Mahamedi Paradice Kreisman LLP; Christopher J. Brokaw

(57) ABSTRACT

Embodiments of the invention prevent contact between a peripheral edge of a magnetic disk and a counter surface of a ramp when the magnetic disk is displaced. In one embodiment, a ramp is disposed near the peripheral side surface of a magnetic disk. The ramp has magnetic disk retainers each having slide surfaces and counter surfaces respectively facing the recording surfaces of the magnetic disk. Grooves or recesses are formed in the counter surfaces to define relief spaces. When the peripheral side surface of the magnetic disk is displaced toward the counter surface by shocks exerted on the magnetic disk drive, the relief space prevents the peripheral edge from coming into contact with the counter surface. Thus the amount of particles produced by the collision of the magnetic disk with the ramp can be reduced.

11 Claims, 7 Drawing Sheets

(A)

(B)

(A)

(B)

(A)

(B)

(A)

(B)

SHOCK IMPROVEMENT RAMP FOR LOAD/UNLOAD MECHANISM AND MAGNETIC DISK DRIVE

CROSS-REFERENCES TO RELATED APPLICATIONS

This application claims priority from Japanese Patent Application No. JP2005-146723, filed May 19, 2005, the entire disclosure of which is incorporated herein by reference.

BACKGROUND OF THE INVENTION

The present invention relates to a load/unload mechanism that reduces dust for a magnetic disk drive.

A head slider included in a magnetic disk drive is caused to fly over the surface of a magnetic disk by the pressure of air currents produced by the rotating magnetic disk acting on its air bearing surface. A rotary actuator rotatably supporting the head slider carries the head slider in a direction substantially parallel to the radius of the magnetic disk to locate the head slider at a position corresponding to a predetermined track. Most magnetic disk drives employ a load/unload mechanism for retracting the head slider to a home position while the magnetic disk drives are stopping or while a recording or a reproducing operation is interrupted.

The load/unload mechanism includes, as principal components, a ramp, a head gimbal assembly (hereinafter, abbreviated to "HGA") and a magnetic disk. The ramp has a slide surface on which a lifting tab formed at the tip of the HGA slides. The slide surface extends inside the peripheral side surface of the magnetic disk so as to cover a recording surface. A magnetic disk drive for a portable device, such as a notebook-size personal computer or a music reproducing device, has been progressively miniaturized and the thickness of the magnetic disk drive has been progressively reduced. Consequently, the gap between the recording surface of the magnetic disk and the ramp has been progressively diminished.

In some cases the magnetic disk collides against the ramp due to play in a spindle holding mechanism or due to the flexion of the magnetic disk when external shocks or external vibrations are exerted on the magnetic disk drive. It is possible that the magnetic disk collides against the ramp due to the fluttering, namely, an undulating motion, of the magnetic disk caused by air currents produced in the magnetic disk drive by the rotating magnetic disk.

If the magnetic disk collides against or comes into contact with the ramp, the surface of the magnetic disk is scratched or the ramp is damaged and, consequently, particles may be produced. Therefore some measures must be taken to prevent collision or contact between the magnetic disk and the ramp. A ramp structure disclosed in Patent document 1 (Japanese Patent Laid-Open No. 2002-279744) prevents collision between the magnetic disk and the ramp when an external shock is exerted on the magnetic disk drive. In the ramp structure shown in FIG. 1 of Patent document 1, a step is formed between counter surfaces 20B and 20C to prevent damaging a load/unload area 10B of the magnetic disk or forming projections in the load/unload area 10B by the contact of the magnetic disk with the ramp. This structure prevents the collision of the load/unload area of the magnetic disk with the ramp by bringing the circumference of the magnetic disk into contact with the counter surface 20C when an external shock is exerted on the magnetic disk drive.

In a ramp structure shown in FIG. 6 of Patent document 2 (Japanese Patent Laid-Open No. 2001-14820), a surface of a base part 70 of a ramp 60 closely opposed to peripheral parts of magnetic disks 16a and 16b is provided with a chamfered projection 72. The peripheral parts of the magnetic disks are able to come into contact with the projection 72 of the ramp when the magnetic disks are caused to vibrate due to exertion of shocks on the HDD (hard disk drive). Consequently, the recording surfaces of the magnetic disks and the surface of the ramp are protected from damaging actions.

In the inventions disclosed in the foregoing documents, the object of preventing collision between the ramp and the magnetic disk is to protect the magnetic disk. Therefore, the peripheral part of the magnetic disk is permitted to come into contact with the ramp. This ramp is one of the sources of particles that will be produced in a magnetic disk drive after the start of using the magnetic disk drive. The inventors of the present invention observed the counter surface of a ramp structure opposed to a magnetic disk to find parts that produce particles in a ramp structure and found that large tool marks are formed in the depth of the counter surface. Contact marks formed by contact between the magnetic disk and the ramp of the magnetic disk drive were found in the circumference of the magnetic disk.

The tool marks were formed in a part of the counter surface of the ramp with which the circumference of the magnetic disk collides. It is inferred that the peripheral edge of the magnetic disk acts like a cutting edge and produces particles by chipping the counter surface of the ramp when the magnetic disk collides against the ramp due to exertion of external vibrations on the operating magnetic disk drive. A magnetic disk drive included in a portable device is highly possible to collide against the ramp particularly while the magnetic disk is rotating.

The foregoing prior art intends to prevent contact between the recording surface of the magnetic disk and the counter surface of the ramp. The circumferential edge of the magnetic disk is brought into contact with the ramp to protect the magnetic disk. Consequently, the production of particles due to contact or collision between the magnetic disk and the ramp, particularly the production of particles due to collision between the rotating magnetic disk and the ramp while the magnetic disk is rotating, cannot be satisfactorily controlled.

BRIEF SUMMARY OF THE INVENTION

It is a feature of the present invention to provide a load/unload mechanism capable of controlling the production of particles due to contact between a magnetic disk and a ramp. Another feature of the present invention is to provide a load/unload mechanism capable of preventing contact between the peripheral edge of a magnetic disk and a ramp. A third feature of the present invention is to provide a ramp for the aforesaid load/unload mechanisms. A fourth feature of the present invention is to provide a magnetic disk drive employing the aforesaid load/unload mechanism.

A load/unload mechanism in a first aspect of the present invention includes: a magnetic disk having a recording surface and a peripheral side surface; a head gimbal assembly including a head slider and a lifting tab; and a ramp having a slide surface on which the lifting tab slides, and a counter surface opposed to the recording surface and defining a relief space associated with the peripheral edge of the recording surface.

The counter surface will not be chipped by the peripheral edge because the relief space around the peripheral edge of the recording surface prevents the peripheral edge from coming into contact with the recording surface when the peripheral side surface is shifted toward the counter surface. This relief space is particularly effective for a magnetic disk drive in which the peripheral side surface may be displaced and may come into contact with the counter surface while the magnetic disk is rotating. The relief space is effective in controlling the production of particles if the recording surface comes into contact with the counter surface before the peripheral edge comes into contact with the counter surface when the peripheral side surface is shifted greatly because the ability of the recording surface to chip the counter surface is less than that of the peripheral edge.

The relief space may be formed by sinking a predetermined area, containing an orthogonal projection of the peripheral side surface, on the counter surface below the level of an area of the counter surface nearer to the recording surface than the predetermined area. The size of the predetermined area is determined selectively such that contact between the peripheral side surface or the peripheral edge and the counter surface can be prevented when the peripheral side surface is shifted toward the counter surface. The relief space may be formed by forming a groove and a slope in the counter surface. The recessed predetermined area or the groove is effective even if the recessed predetermined area or the groove has a small width when the recessed predetermined area or the groove has a shape resembling a circular arc. The reduction of the strength of the ramp can be prevented when the recessed predetermined area or the groove has the small width.

A magnetic disk drive in a second aspect of the present invention includes: a magnetic disk having a recording surface and a peripheral side surface; a head gimbal assembly including a head slider and provided with a lifting tab; an actuator assembly supporting the head gimbal assembly for turning; and a ramp disposed near the peripheral side surface and having a slide surface on which the lifting tab slides, and a counter surface opposed to the recording surface and defining a relief space associated with the peripheral edge of the recording surface.

A magnetic disk drive in a third aspect of the present invention includes: a magnetic disk having a first recording surface, a second recording surface and a peripheral side surface; a first head gimbal assembly including a first head slider and provided with a first lifting tab; a second head gimbal assembly including a second head slider and provided with a second lifting tab; an actuator assembly supporting the first and the second head gimbal assemblies for turning; and a ramp disposed near the peripheral side surface, and having a first slide surface on which the first lifting tab slides, a first counter surface opposed to the first recording surface, a second slide surface on which the second lifting tab slides and a second counter surface opposed to the second recording surface; wherein a wide area between the first and the second counter surfaces is wider than a space between the first counter surface on the side of the recording surface and the second counter surface.

A magnetic disk drive in a fourth aspect of the present invention includes: a magnetic disk having a recording surface and a peripheral side surface; a head gimbal assembly including a head slider and a lifting tab; an actuator assembly supporting the head gimbal assembly for turning; and a ramp having a slide surface on which the lifting tab slides, and a counter surface opposed to the recording surface; wherein a part of the recording surface facing the counter surface is inclined so that the thickness of the magnetic disk decreases toward the peripheral side surface.

A ramp in a fifth aspect of the present invention disposed near a peripheral side surface of a magnetic disk having a recording surface has: a slide surface; a counter surface opposed to the recording surface and defining a relief space corresponding to the peripheral edge of the recording surface; and a support part supporting the slide surface and the counter surface.

DETAILED DESCRIPTION OF THE INVENTION

Figure 1:
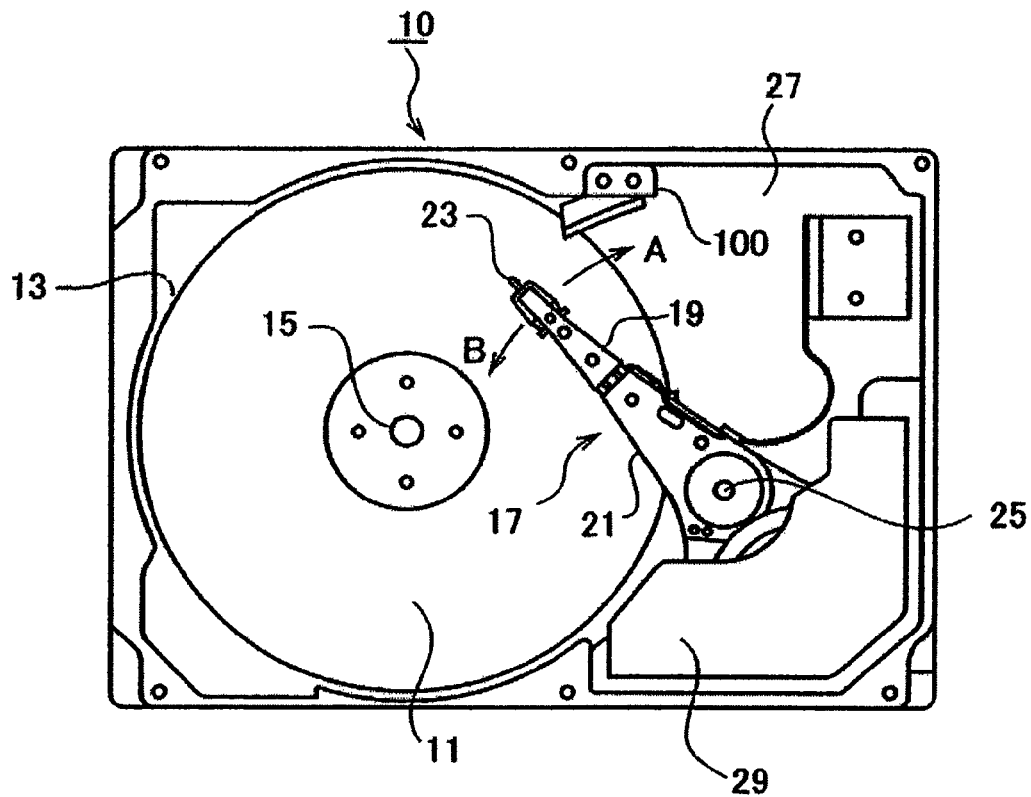
FIG. 1 is a plan view of a magnetic disk drive in an exemplary embodiment according to the present invention.

FIG. 1 is a plan view of a magnetic disk drive 10 in an exemplary embodiment according to the present invention. Magnetic disks 11 are supported for rotation on a spindle shaft 15. A spindle motor attached to a base 27 rotates the spindle shaft 15. The two magnetic disks 11 are separated by a predetermined vertical space. The two magnetic disks 11 rotate together on the spindle shaft 15. The two magnetic disks 11 are the same in construction and each of the magnetic disks 11 has opposite recording surfaces.

A head support mechanism 17 includes an HGA 19 and an actuator assembly 21. The HGA 19 includes a suspension assembly having a flexure and a load beam, and a head slider attached to the flexure. A lifting tab 23 is formed on the tip of the HGA 19. The lifting tab 23 slides on the slide surface of a ramp 100. The HGA 19 is attached to the actuator assembly 21. Four HGAs 19 are disposed with predetermined intervals in association with the four recording surfaces of the two magnetic disks 11.

The actuator assembly 21 holds a voice coil, not shown, and employs a rotary actuator mechanism. A voice coil motor including the voice coil and a voice coil magnet 29 turns the actuator assembly 21 about a pivot 25 in the directions of the arrows A and B. The ramp 100 included in a load/unload mechanism is disposed near the peripheral side surfaces 13 of the magnetic disks 11 and is fixed to the bottom surface of the base 27.

The operation of the load/unload mechanism included in the magnetic disk drive 10 will be explained. The load/unload mechanism includes, as principal components, the magnetic disks 11, the HGAs 19 and the ramp 100. The head sliders are spaced from the surfaces of the magnetic disks 11 by air currents while the magnetic disks 11 are rotating. The head sliders are pressed against the recording surfaces of the magnetic disks 11 by the pressure exerted thereon by the load beam after the rotation of the magnetic disks 11 has been stopped. Since the recording surfaces of the magnetic disks 11 are mirror finished and are coated with a lubricant, the head sliders stick to the recording surfaces of the magnetic disks. If the rotation of the magnetic disks 11 is resumed with the head sliders sticking to the recording surfaces of the magnetic disks 11, the spindle motor is heavily loaded and unable to start operating and the recording surfaces of the magnetic disks 11 are damaged by stiction.

In the magnetic disk drive of the load/unload system, the lifting tabs 23 slide on the slide surfaces of the ramp 100 and the head sliders are unloaded back off onto the ramp 100 when the head support mechanism 17 turns the head sliders in the direction of the arrow A before the rotation of the magnetic disks 11 is stopped. This operation is called an unloading operation for unloading the head sliders. When the magnetic disk drive starts a read/write operation, the head support mechanism 17 turns the head sliders in the direction of the arrow B after the rotation of the magnetic disks 11 has been started. This operation is called a loading operation for loading the head sliders. The loading operation or the unloading operation is also performed when the read/write operation is interrupted with the magnetic disks 11 kept rotating.

A part of the slide surface of the ramp 100 extends above the recording surface of the magnetic disk 11 to enable the actuator assembly 21 to turn smoothly for loading and unloading. Thus parts of the recording surfaces near the peripheral side surfaces 13 of the magnetic disks 11 pass through spaces formed in the ramp 100 when the magnetic disks 11 are rotated. The construction of the ramp 100 will be described with reference to FIGS. 2 to 4.

Figure 2:
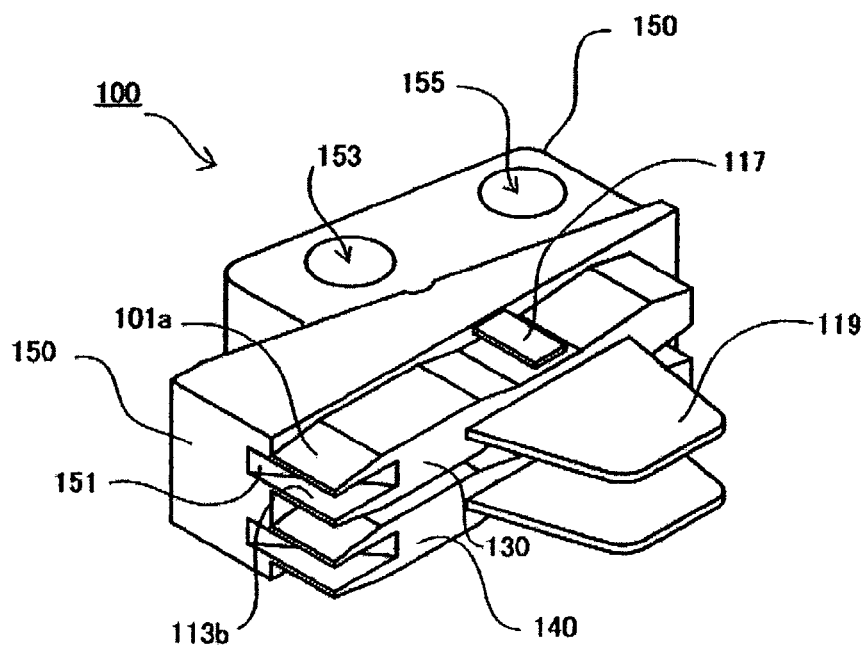
FIG. 2 is a perspective view of a ramp.
Figure 3:
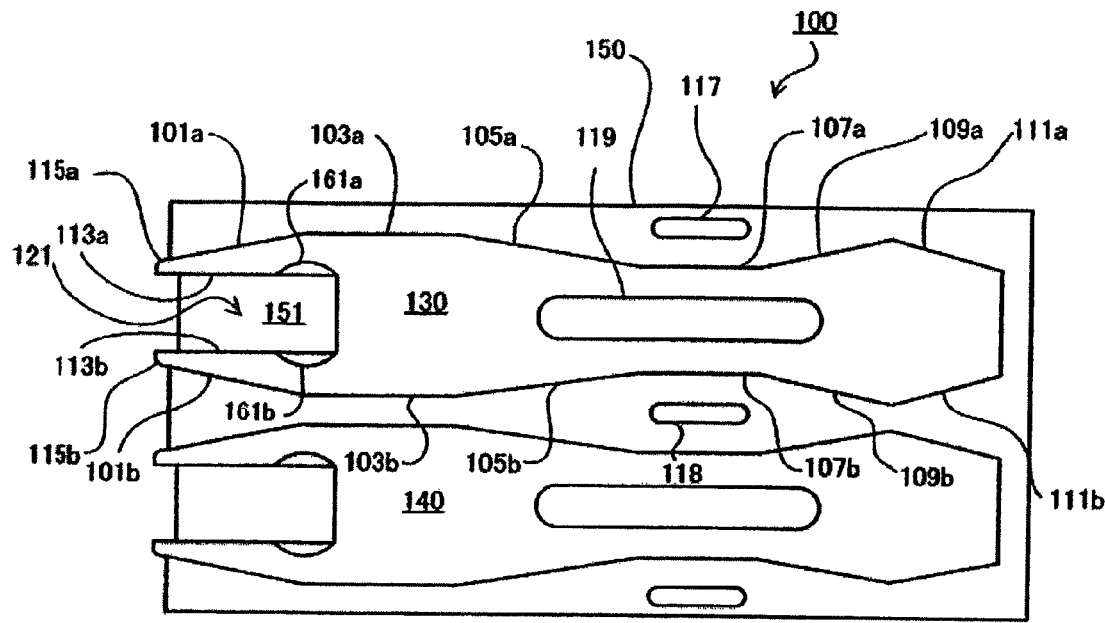
FIGS. 3(A) and 3(B) are a side elevation of the ramp and a perspective view of a front part of the ramp, respectively.
Figure 3:
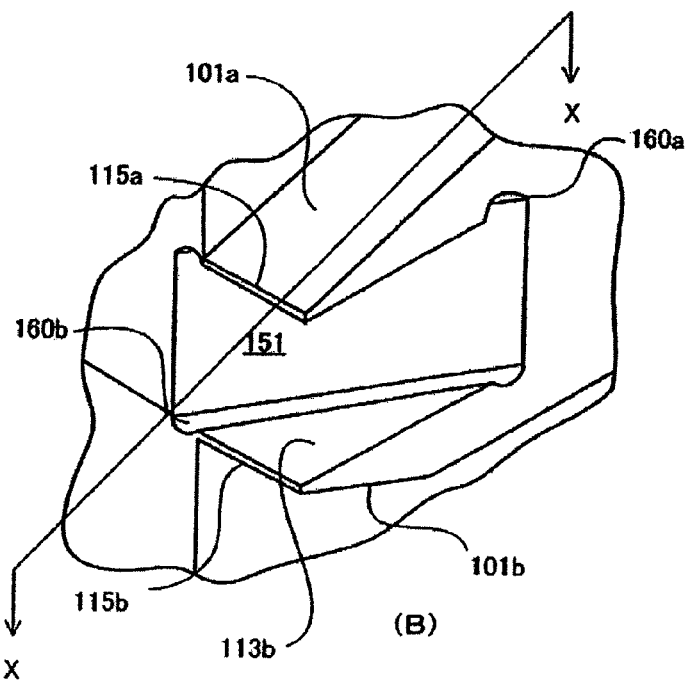

FIG. 2 is a schematic perspective view of the ramp 100, FIG. 3(A) is a side elevation of the ramp 100, FIG. 3(B) is a perspective view of a front end part of the ramp 100, FIG. 4(A) is a sectional view taken on the line X-X in FIG. 3(B), including a part of the magnetic disk 11, and FIG. 4(B) is a plan view of the front end part of the ramp 100, including a part of the peripheral side surface 13 of the magnetic disk 11. Usually, the ramp 100 is formed of a polyacetal resin (polyoxymethylene resin). Derlin® (Du Pont), Duracon® (Polyplastics Co., Ltd.) and Tenac® (Asahi Kasei Chemicals Corporation) are commercially available polyacetal resins.

The ramp 100 has a base part 150 and two head slider retainers 130 and 140 projecting from the base part 150. The four head sliders associated with the two magnetic disks 11 are retracted onto the head slider retainers 130 and 140. The ramp 100 is an integral member formed by injection molding or extrusion molding. The base part 150 is provided with two holes 153 and 155. Screws are inserted in the two holes 153 and 155 and are screwed into threaded holes formed in the base 27 to fasten the base part 150 to the base 27. The head slider retainers 130 and 140 are associated with the upper and the lower magnetic disk 11, respectively. The two head sliders are retracted onto each of the head slider retainers 130 and 140. The head slider retainers 130 and 140 are the same in construction and hence only the head slider retainer 130 will be described.

The head slider retainer 130 has slide surfaces 101a, 103a, 105a, 107a, 109a and 111a and slide surfaces 101b, 103b, 105b, 107b, 109b and 111b on which the lifting tab 23 slides. The slide surfaces 101a and 101b have front edges 115a and 115b, respectively. Counter surfaces 113a and 113b are formed respectively opposite to the slide surfaces 101a and 101b. The counter surfaces 113a and 113b face the recording surfaces 12a and 12b of the magnetic disk 11, respectively. The distance between the counter surfaces 113a and 113b is on the order of 1 mm. The thickness of gaps between the counter surface 113a and the recording surface 12a and between the counter surface 113b and the recording surface 12b is about 0.185 mm. The slide surfaces 101a to 111a and the slide surfaces 101b to 111b are symmetrical with respect to a center plane passing the middle of the thickness of the magnetic disk 11, respectively, and hence only the slide surfaces 101a to 111a will be described by way of example. The front edge 115a is the edge of the slide surface 101a with which the lift tab 23 comes into contact first in the unloading operation. The slide surface 101 is inclined to the bottom surface of the base 27. A home position at which the lifting tab 23 rests on the head slider retainer 130 when the head slider is retracted is on the slide surface 107a. The slide surface 107a is parallel to the bottom surface of the base 27. When the head slider is unloaded, the actuator assembly 21 comes into contact with an outer crash stop, not shown, and the lifting tab 23 stops at the home position.

The lifting tab 23 slides on the slide surfaces 101a to 105a in the loading and the unloading operation. The lifting tab 23 slides on the slide surfaces 109a and 111a when the head support mechanism 17 is attached to the base 27 after fixing the magnetic disk 11 and the ramp 100 to the base 27. Plates 117 and 118 restrain the suspension assembly from jumping when an external shock is exerted on the magnetic disk drive while the head slider is retracted to the home position to prevent the suspension assembly from damaging the slide surface 107a. A plate 119 restrains head sliders retracted to the home positions from jumping when an external shock is exerted on the magnetic disk drive to prevent the head sliders from damaging each other.

A disk-receiving space 121 surrounded by the counter surfaces 113a and 113b and a side wall surface 151 is formed such that parts of the recording surfaces 12a and 12b near the peripheral side surface 13 of the magnetic disk 11 are able to move through the disk-receiving space 121 when the magnetic disk 11 rotates. The side wall surface 151 is continuous with the counter surfaces 113a and 113b and faces the peripheral side surface 13 of the magnetic disk 11. Recesses 161a and 161b are formed in the counter surfaces 113a and 113b, respectively, along the side surface 151. A narrow gap is formed between the peripheral side surface 13 and the side wall surface 151. As shown in FIGS. 4(A) and 4(B), the recesses 161a and 161b formed in the counter surfaces 113a and 113b have a predetermined width W and contain the orthogonal projection of the peripheral side surface 13 of the magnetic disk 11. The width W is selectively determined so that the peripheral edges 14 and the peripheral side surface 13 may not come into contact with the counter surfaces 113a and 113b when the magnetic disk 11 is tilted as shown in FIG. 4(A). The recesses 161a and 161b may be formed in the shape of a circular arc extending along the orthogonal projection of the peripheral side surface 13.

Figure 5:
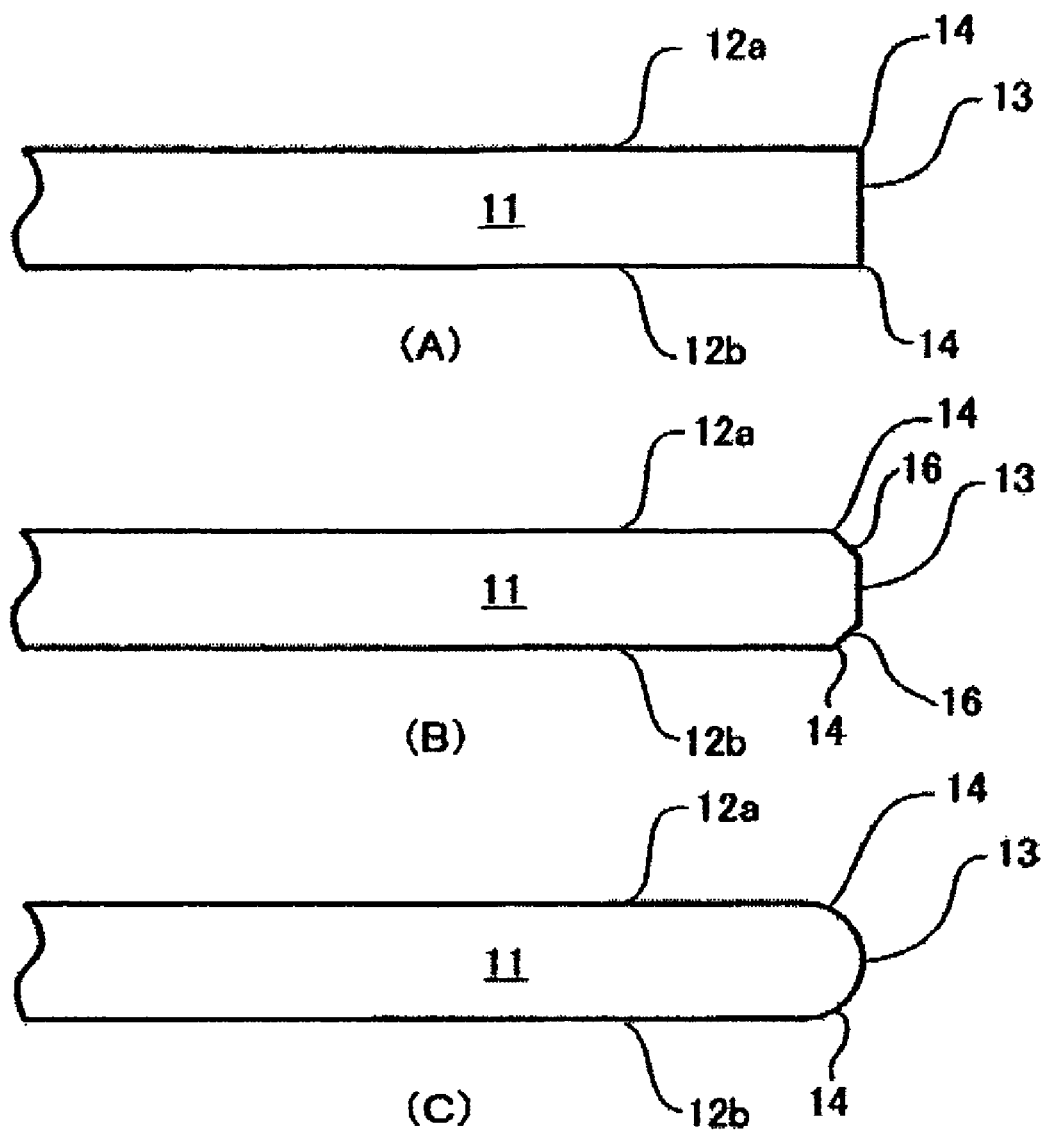
FIGS. 5(A), 5(B) and 5(C) are views of assistance in explaining the relation between the peripheral side surface and the peripheral edges of the magnetic disk.

The relation between the peripheral side surface 13 and the peripheral edge 14 of the recording surface of the magnetic disk 11 will be explained with reference to FIG. 5. In FIG. 5(A), the recording surfaces 12a and 12b intersect the peripheral side surface 13 perpendicularly. The peripheral side surface 13 is perpendicular to the recording surfaces 12a and 12b or planes containing the recording surfaces 12a and 12b. The peripheral edges 14 are intersectional lines where the peripheral side surface 13 joins with the recording surfaces 12a and 12b. In FIG. 5(B), edges where the peripheral side surface 13 is joined with the recording surfaces 12a and 12b are chamfered to form beveled edges 16. Peripheral edges 14 are formed between the beveled edge 16 and the recording surface 12a and between the beveled edge 16 and the recording surface 12b.

Suppose that the counter surface 113a is a plane. Then, as shown in dotted lines of FIG. 4(A), it may be considered that the peripheral edge 14 is a part, in an area near the peripheral side surface 13 of the magnetic disk 11, that comes into contact with the counter surface 113a first when the peripheral side surface 13 is shifted toward the counter surface 113a. The peripheral edge 14 is a line where two planes intersect each other. The sharper the peripheral edge 14, i.e., the smaller the angle between the surfaces intersecting each other and forming the peripheral edge 14, the higher is the effect of the peripheral edge 14 on chipping the counter surface. When the periphery of the magnetic disk 11 is rounded to form a round peripheral side surface 13 continuously merging into the recording surfaces 12a and 12b as shown in FIG. 5(C), the peripheral side surface 13 is defined as an outermost area of the magnetic disk 11. Peripheral edges 14 are a part of the round peripheral side surface 13 that comes into contact with the counter surface 113a first when the periphery of the magnetic disk 11 is shifted toward the counter surface 113a and a part of the round peripheral side surface 13 that comes into contact with the counter surface 113b first when the periphery of the magnetic disk 11 is shifted toward the counter surface 113b.

The magnetic disk 11 is fixed around the spindle shaft 15. Therefore, when the periphery of the magnetic disk 11 is shifted toward either of the counter surfaces, a displacement resulting from tilting as indicated by dotted lines in FIG. 4(A) is greater than a displacement parallel to the bottom surface of the base 27. The recesses 161a and 161b define relief spaces 160a and 160b, respectively. The relief spaces 160a and 160b prevent contact or collision between the peripheral edge 14 of the magnetic disk 11 and the counter surface 113a and between the peripheral edge 14 of the magnetic disk 11 and the counter surface 113b, respectively, when the magnetic disk 11 is displaced.

Modes of touch of the magnetic disk 11 to the ramp 100 are classified into contact and collision by the magnitude of impulsive force exerted by the magnetic disk 11 on the ramp 100 when the magnetic disk 11 touches the ramp 100. The characteristic of the present invention and the effect of the relief spaces 160a and 160b are not dominated by the mode of touch of the magnetic disk 11 to the ramp 100. Therefore the touch of the magnetic disk 11 to the ramp 100 will be expressed by the term "contact" in the following description. The relief spaces 160a and 160b prevent contact between the peripheral edge 14 and the counter surface 113a and between the peripheral edge 14 and the counter surface 113b. Therefore the counter surfaces 113a and 113b will not be chipped by the peripheral edges 14. The peripheral edge 14 of the rotating magnetic disk 11 has a particularly high effect on chipping the counter surface. The relief spaces 160a and 160b avoid chipping the counter surfaces with reliability.

If the magnetic disk 11 is displaced greatly to a position indicated by dotted lines in FIG. 4(A), the recording surface 12a comes into contact with the edge of the counter surface 113a corresponding to the edge of the recess 161a before the peripheral edge 14 of the magnetic disk 11 comes into contact with the bottom of the recess 161a. Thus the peripheral edge 14 does not come into contact with any parts of the counter surface 113a. In other words, the recess 161a needs to be formed in a depth such that the peripheral edge 14 is not in contact with the counter surface 113a or the bottom of the recess 161 when the recording surface 12a comes into contact with a part of the counter surface 113a. Since the recording surface 12a is flat, the effect of the recording surface 12a on chipping the counter surface 113a is less than that of the peripheral edge 14 and hence fewer particles are produced by the contact between the recording surface 12a and a part of the counter surface 113a. A peripheral area, of the recording surface 12a that moves through the disk-receiving space 121 is not used for recording data. Therefore, problems will not arise in the recording ability of the magnetic disk 11 even if the peripheral area of the magnetic disk 11 comes into contact with the counter surface 113a.

To further reduce the amount of particles produced by the contact between the recording surface 12a and the counter surface of the ramp 100, it is desirable to round the boundary between the recess 161a and the counter surface 113a so that the bottom surface of the recess 161a may smoothly merge into the counter surface 113a. The relief space 160a (160b) avoids contact between the peripheral edge 14 and the counter surface 113a (113b) when the magnetic disk 11 is displaced greatly to such an extent that the recording surface 12a (12b) comes into contact with the counter surface 113a (113b). The relief space 160a (160b) also avoids contact between the peripheral edge 14 and the counter surface 113a (113b) when the magnetic disk 11 is displaced to such an extent that the recording surface 12a (12b) does not come into contact with the counter surface but the peripheral edge 14 comes into contact with the counter surface if the counter surface is flat.

Figure 6:
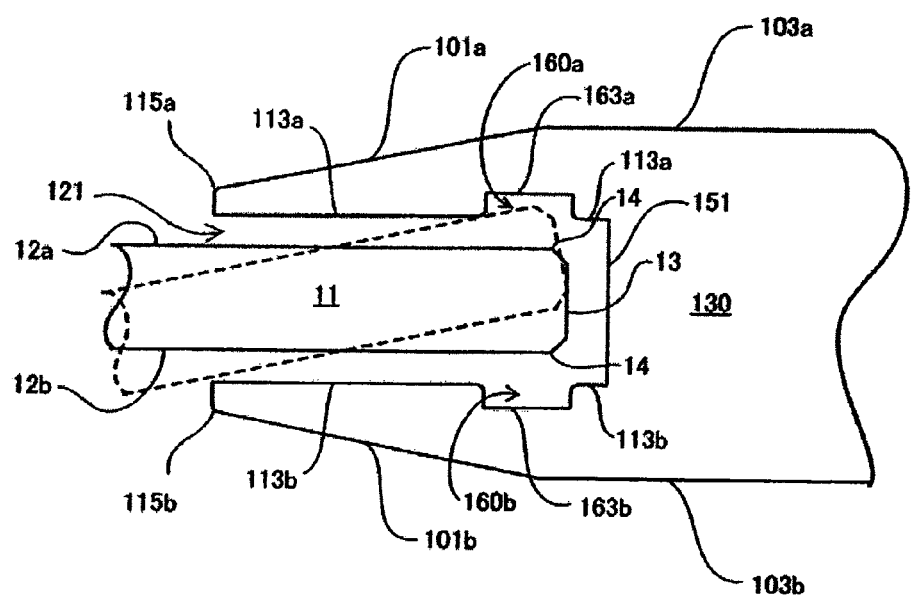
FIGS. 6(A) and 6(B) are a fragmentary side elevation and a fragmentary plan view, respectively, of a ramp and a magnetic disk included in another embodiment according to the present invention.
Figure 6:
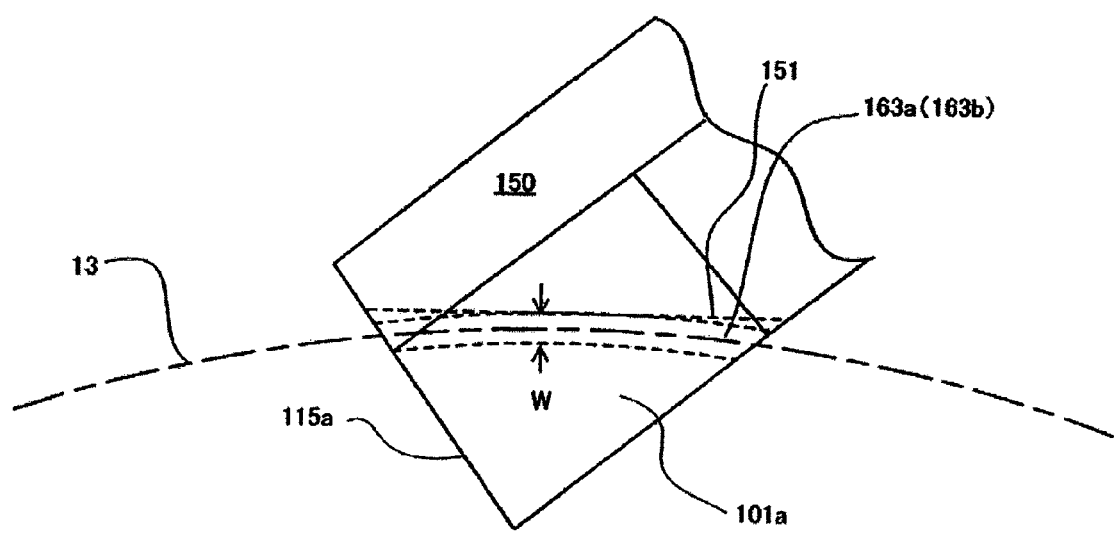

FIG. 6 shows another embodiment according to the present invention in which relief spaces are formed in a head slider retainer. FIGS. 6(A) and 6(B) are a side elevation and a plan view, respectively. The head slider retainer 130 and a magnetic disk 11 are substantially similar in construction to those shown in FIG. 4. The head slider retainer 130 shown in FIG. 6 has counter surfaces 113a and 113b provided with grooves 163a and 163b, respectively to form relief spaces 160a and 160b. As shown in FIG. 6(B), the grooves 163a and 163b are formed in the counter surfaces 113a and 113b, respectively in width W and in a shape resembling a circular arc extending along the peripheral side surface 13 of the magnetic disk 11. The width W of the grooves 163a and 163b necessary for forming a relief space of a predetermined size is smaller than that of the longitudinally straight recesses 161a and 161b shown in FIG. 4. The narrow grooves 163a and 163b are effective in preventing the strength reduction of parts forming slide surfaces 101a and 101b.

Figure 7:
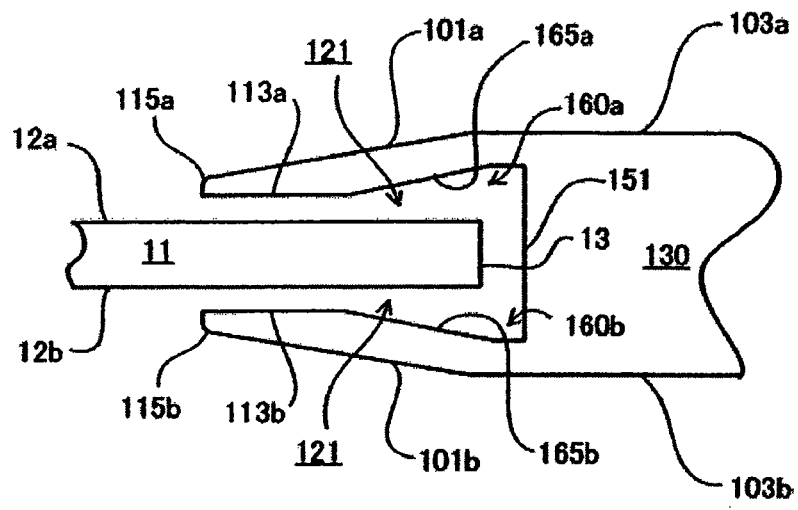
FIG. 7 is a fragmentary side elevation of a ramp defining relief spaces included in another embodiment according to the present invention.

The relief spaces 160a and 160b avoid the contact of the peripheral edges 14 of the magnetic disk 11 with the counter surfaces 113a and 113b. The relief spaces 160a and 160b may be formed by a method other than a method using the recesses or the grooves. A ramp shown in FIG. 7 is the same in construction as the ramp 100 shown in FIG. 4, except that the ramp shown in FIG. 7 is provided with slopes 165a and 165b to form relief spaces. As shown in FIG. 7, flat counter surfaces 113a and 113b are formed on the side of front edges 115a and 115b, and the slopes 165a and 165b are formed continuously with the counter surfaces 113a and 113b so as to diverge from each other to form a disk-receiving space 121 expanding toward the side surface 151, thereby forming relief spaces 160a and 160b.

Figure 8:
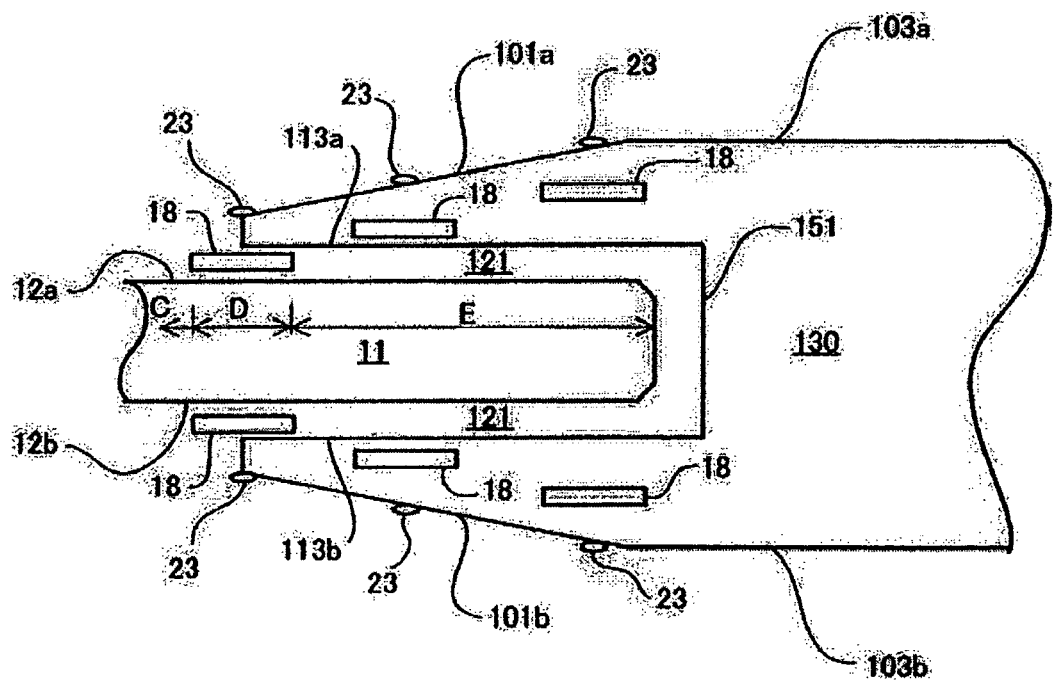
FIG. 8 is a view of assistance in explaining the condition of a head slider during load/unload operations.

FIG. 8 shows three positions of each of the two combinations each of the lifting tab 23 and the head slider 18 of the HGA 19 during a loading or unloading operation. Each of the recording surfaces 12a and 12b of the magnetic disk 11 has a recording area C extending between the innermost and the outermost track, a load/unload area D corresponding to the area in which the projection of the head slider 18 is formed when the lifting tab 23 is at the front edge 115a (115b) of the slide surface 101a (101b), and a nonrecording area E. The load/unload area D is not used for recording because it is highly possible that the head slider 18 comes into contact with the load/unload area D when the head slider 18 is loaded.

While the head slider 18 is being moved from the recording area C toward the load/unload area D to unload the head slider 18, the head slider 18 is caused to fly at a predetermined flying height by the lifting effect of air currents produced over the recording surface 13a (13b). Upon the contact of the lifting tab 23 with the front edge 115a (115b) of the slide surface 101a (101b), the head slider 18 starts climbing up the slide surface 101a (101b) and the head slider 18 is suspended from the lifting tab 23 by the flexure. Therefore, the head slider 18 does not need to be lifted up by the lifting effect of air currents produced over the recording surface 12a (12b) at positions corresponding to the nonrecording area E. However the nonrecording area E is necessary to make the slider head 18 fly above the load/unload area D by gradually exerting the lifting force of air currents produced over the recording surface 12a (12b) on the slider head 18 as the lifting tab 23 slides down the slide surface 101a (101b) to enable the lifting tab 23 to separate smoothly from the front edge 115a (115b) when the head slider 18 is loaded.

Figure 9:
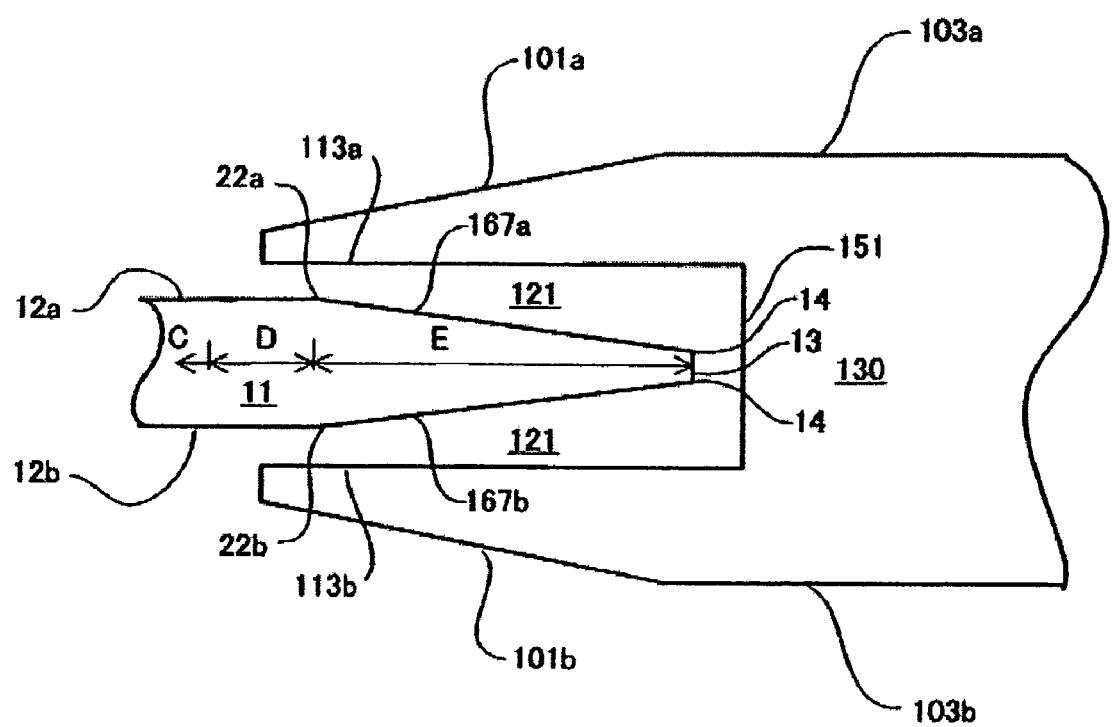
FIG. 9 is a side elevation of assistance in explaining a magnetic disk having a tapered peripheral part near the side surface of the magnetic disk.

FIG. 9 shows another embodiment according to the present invention provided by focusing attention on the nonrecording area E. This head slider retainer 130 is designed to prevent contact between each of the peripheral edges 14 of a magnetic disk 11 and each of counter surfaces 113a and 113b by the characteristic function of a nonrecording area E. The head slider retainer 130 shown in FIG. 9 is the same in construction as the head slider retainer 130 shown in FIG. 4, except that any spaces corresponding to the relief spaces 161a and 161b are not formed in the counter surfaces 113a and 113b of the former. Slopes 167a and 167b are formed in a peripheral part of the magnetic disk 11 between a part corresponding to boundary lines 22a and 22b between the load/unload area D and the nonrecording area E and the peripheral side surface 13 such that the thickness of the peripheral part decreases toward the peripheral side edge 13. When the peripheral side surface 13 is displaced toward the counter surface 113a or 113b, the peripheral edge 14 does not come into contact with the counter surface 113a or 113b even if the counter surfaces 113a and 113b are flat. The slopes 167a and 167b extend only in a disk-receiving space 121 and part of the load/unload area D lies in the disk-receiving space 121.

Figure 4:
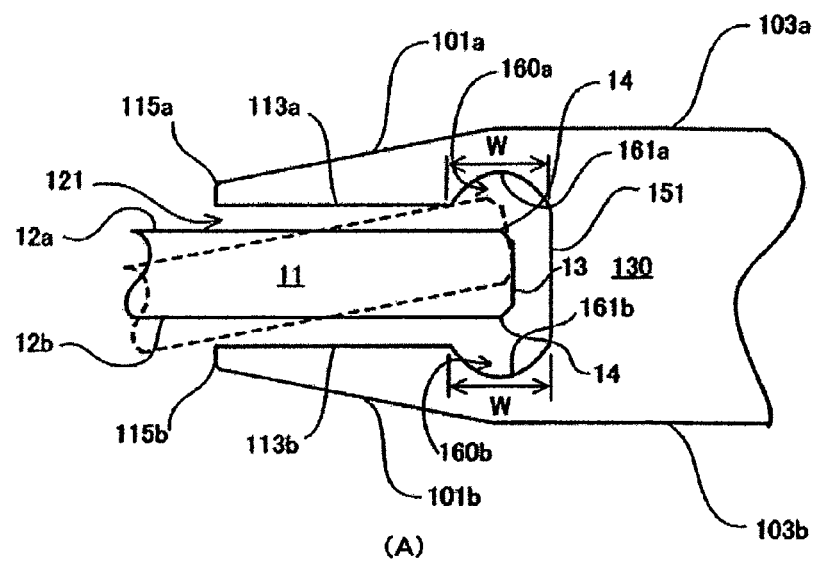
FIGS. 4(A) and 4(B) are a fragmentary side elevation and a fragmentary plan view, respectively, of a ramp defining relief spaces and a magnetic disk.
Figure 4:
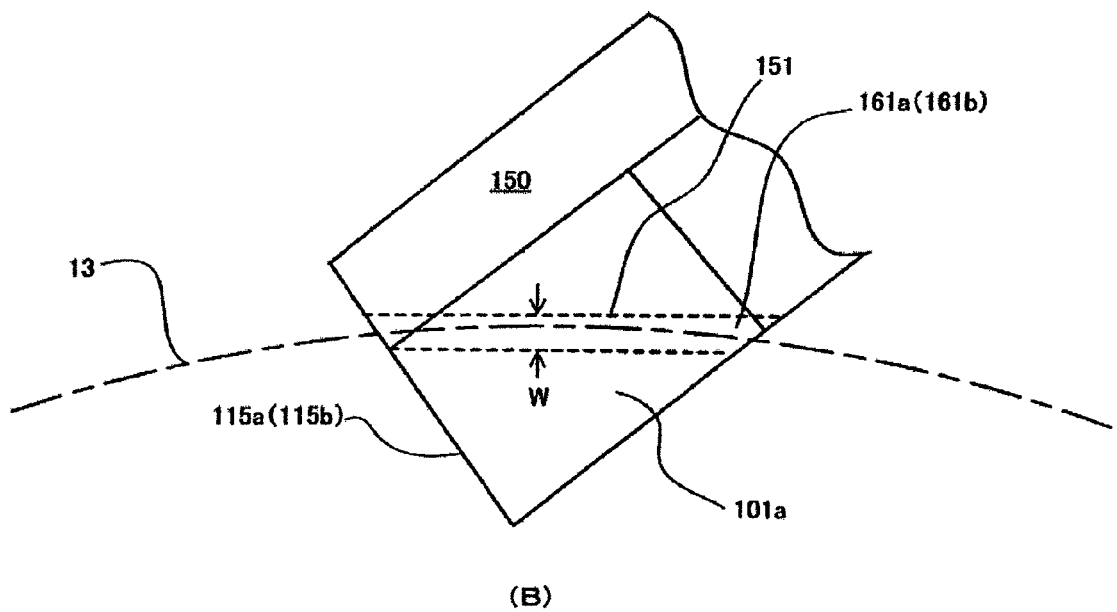

If the magnetic disk 11 is displaced greatly, the boundary line 22a between the load/unload area D and the slope 167a (the boundary line 22b between the load/unload area D and the slope 167b) comes into contact with the counter surface 113a (113b) but the peripheral edge 14 does not come into contact with the counter surface 113a (113b). The boundary lines 22a and 22b are different from the peripheral edges 14 previously described in connection with FIG. 5(B). The beveled edges 16 shown in FIG. 5(B) are formed to avoid stress concentration on edges and breakage of edges due to collision against an obstacle. As shown in FIG. 5(B) the edges 14 are formed at the joints of the beveled edges 16 and the recording surfaces 12a and 12b to have a small angle. The boundary lines 22a and 22b shown in FIG. 9 are edges of a large angle because the slopes 167a and 167b extend in the widest possible range in the disk-receiving space 121. Therefore, the counter surfaces 113a and 113b are chipped'scarcely by parts corresponding to the boundary lines 22a and 22b even if those parts come into contact with the counter surfaces 113a and 113b, respectively. The magnetic disk 11 having a sectional shape as shown in FIG. 9 can be combined with the ramp 100 having the relief spaces 160a and 160b as shown in FIGS. 4 and 5 to form a load/unload mechanism.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A ramp disposed near a peripheral side surface of a magnetic disk having a recording surface with a peripheral edge, said ramp including:
    a slide surface;
    a counter surface opposed to the recording surface and defining a relief space formed diagonally with respect to the slide surface and associated with the peripheral edge of the recording surface; and
    a support part supporting the slide surface and the counter surface;
    wherein the relief space is configured such that the recording surface comes into contact with the counter surface before the peripheral edge comes into contact with the counter surface when the peripheral edge is displaced toward the counter surface.

2. The ramp according to claim 1, wherein the relief space is defined by a recess having a shape of a predetermined width resembling a circular arc and extending along the peripheral side surface.

3. The ramp according to claim 1, wherein a slope is formed in a part of the counter surface so as to incline from the side of the recording surface toward the side of the peripheral side surface with an increasing size to provide the relief space.

4. A load/unload mechanism comprising:
    a magnetic disk having a recording surface and a peripheral side surface including a top and bottom peripheral edge;
    a head gimbal assembly including a head slider and a lifting tab; and
    a ramp having a slide surface on which the lifting tab slides, and a counter surface opposed to the recording surface and defining a relief space formed diagonally with respect to the slide surface and associated with either the top or bottom peripheral edge of the recording surface;
    wherein the relief space is configured such that the recording surface comes into contact with an edge of the counter surface before the peripheral edge comes into contact with the counter surface when the peripheral edge is displaced toward the counter surface.

5. The load/unload mechanism according to claim 4, wherein a predetermined area, containing an orthogonal projection of the peripheral side surface, on the counter surface is below the level of an area of the counter surface nearer to the recording surface than the predetermined area to provide the relief space.

6. The load/unload mechanism according to claim 4, wherein a part of the counter surface slopes from the side of the recording surface toward the side of the peripheral side surface to provide the relief space.

7. A magnetic disk drive comprising:
    a magnetic disk having a recording surface and a peripheral side surface including a top and bottom peripheral edges;
    a head gimbal assembly including a head slider and provided with a lifting tab;
    an actuator assembly supporting the head gimbal assembly for turning; and
    a ramp disposed near the peripheral side surface and having a slide surface on which the lifting tab slides, and a counter surface opposed to the recording surface and defining a relief space formed diagonally with respect to the slide surface and associated with either the top or bottom peripheral edge of the recording surface;

wherein the relief space is configured such that the recording surface comes into contact with an edge of the counter surface before the peripheral edge comes into contact with the counter surface when the peripheral side edge is displaced toward the counter surface.

8. The magnetic disk drive according to claim 7, wherein the relief space has a shape of a predetermined width resembling a circular arc and extends along an orthogonal projection of the peripheral side surface.

9. The magnetic disk drive according to claim 7, wherein a predetermined area, containing an orthogonal projection of the peripheral side surface, on the counter surface is below the level of an area of the counter surface nearer to the recording surface than the predetermined area to provide the relief space.

10. The magnetic disk drive according to claim 7, wherein a groove is formed in a predetermined area, containing an orthogonal projection of the peripheral side surface, on the counter surface to provide the relief space.

11. The magnetic disk drive according to claim 7, wherein a part of the counter surface slopes from the side of the recording surface toward the side of the peripheral side surface with an increasing size to provide the relief space.

* * * * *